United States Patent
Ralph (10) Patent No.: US 6,823,242 B1
(45) Date of Patent: Nov. 23, 2004

(54) METHOD AND APPARATUS FOR MONITORING WHEEL/BRAKE PERFORMANCE

(75) Inventor: Robert Waldo Ralph, Hixson, TN (US)

(73) Assignee: Norfolk Southern Corporation, Norfolk, VA (US)

(*) Notice: Subject to any disclaimer, the term of this patent is extended or adjusted under 35 U.S.C. 154(b) by 2 days.

(21) Appl. No.: 10/252,245

(22) Filed: Sep. 23, 2002

(51) Int. Cl.$^7$ ................................. G05D 5/00
(52) U.S. Cl. ........................... 701/19; 340/682
(58) Field of Search ................. 701/19; 105/404, 105/375, 81; 340/584, 682

(56) References Cited

U.S. PATENT DOCUMENTS

| | | |
|---|---|---|
| 3,033,018 A | 5/1962 | Haggadone |
| 3,235,723 A | 2/1966 | Pelino |
| 3,454,758 A | 7/1969 | Gallagher |
| 3,546,447 A | 12/1970 | Thompson et al. |
| 3,629,572 A | 12/1971 | Gallagher |
| 3,646,343 A | 2/1972 | Caulier et al. |
| 3,731,087 A | 5/1973 | King |
| 3,767,146 A | 10/1973 | Gallagher |
| 4,058,279 A | 11/1977 | Frielinghaus |
| 4,313,583 A | 2/1982 | Bambara et al. |
| 4,316,175 A * | 2/1982 | Korber et al. ............ 246/169 A |
| 4,323,211 A | 4/1982 | Bambara et al. |
| 4,347,569 A * | 8/1982 | Allen et al. ................... 701/82 |
| 4,659,043 A | 4/1987 | Gallagher |
| 4,696,446 A | 9/1987 | Mochizuki et al. |
| 4,702,104 A | 10/1987 | Hallberg |
| 4,781,060 A | 11/1988 | Berndt |
| 4,805,854 A | 2/1989 | Howell |
| 4,960,251 A | 10/1990 | Nyman |
| 5,149,025 A * | 9/1992 | Utterback et al. ........ 246/169 A |
| 5,331,311 A | 7/1994 | Doctor |
| 5,381,700 A | 1/1995 | Grosskopf, Jr. |
| 5,392,716 A * | 2/1995 | Orschek et al. ............... 105/61 |
| 5,397,900 A | 3/1995 | Wetzler |
| 5,446,452 A * | 8/1995 | Litton .................... 340/870.17 |
| 5,448,072 A | 9/1995 | Gallagher |
| 5,660,470 A | 8/1997 | Mench |
| 5,677,533 A * | 10/1997 | Yaktine et al. ............... 250/342 |

FOREIGN PATENT DOCUMENTS

JP          401190576 A          7/1989

* cited by examiner

Primary Examiner—Marthe Y. Marc-Coleman
(74) Attorney, Agent, or Firm—Dykema Gossett PLLC (57) ABSTRACT

A sliding wheel detector apparatus automatically detects a sliding wheel condition of a wheel of a passing train. The apparatus includes means for parsing the cars (and trucks thereof) and segregating the same into brake valve groupings. The apparatus also includes means for determining a ratio between a wheel being evaluated and the rest of the wheels in a brake valve group. A sliding wheel will be much cooler than a properly braking wheel, and a ratio threshold is selected to detect this difference in temperature and produce an alarm.

31 Claims, 5 Drawing Sheets

METHOD AND APPARATUS FOR MONITORING WHEEL/BRAKE PERFORMANCE

BACKGROUND OF THE INVENTION

1. Technical Field

This invention relates generally to monitoring systems for the railroad industry, and, more particularly, to a method and apparatus for determining a condition of the wheels/brake systems on a passing railroad train.

2. Discussion of the Related Art

Figure 1:
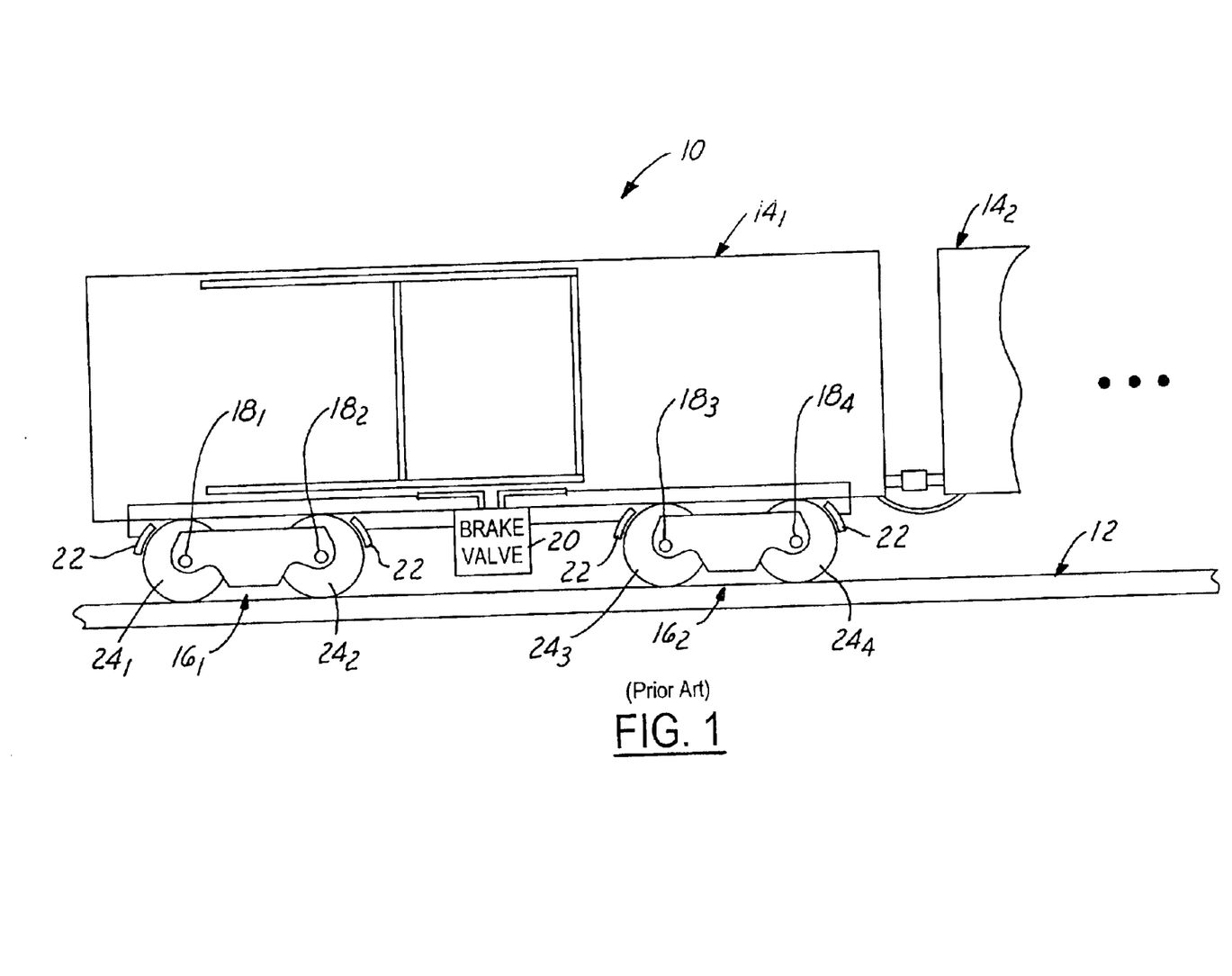
FIG. 1 is a diagrammatic view of a conventional train having multiple cars.

FIG. 1 illustrates a portion of a train 10 as known in the art. Train 10 includes a locomotive or the like (not shown) as well as one or more vehicles or cars (hereinafter "cars") $14_1, 14_2, \ldots 14_n$. Each car 14, such as shown for car $14_1$, may include a plurality of trucks, such as trucks $16_1$ and $16_2$. Cars come in many different types, for example, a roadrailer type that comes with one truck per car and brake valve. A car 14 could have as many as ten trucks 16, although typically the number of trucks is two (a plurality in any event). As known, however, trucks generally occur in even numbered pairs. In turn, each truck 16, as shown for trucks $16_1$ and $16_2$, typically includes two or more axle bearing systems (hereinafter "axles"), such as axles $18_1$ and $18_2$ for truck $16_1$, and axles $18_3$ and $18_4$ for truck $16_2$. Again, it should be understood that trucks sometimes includes more than two axles (e.g., three), while in other situations, sometimes only one axle.

In addition, train 10 typically includes a pneumatic braking system, which may include a main air pipe from the locomotive (not shown) from which pressurized air is tapped by and to various brake valves, which is shown for car $14_1$ as a brake valve 20. Brake valve 20 controls the operation of a brake cylinder (not shown) which, as know to those of ordinary skill in the art, controls the actuation of one or more brake shoes 22. Each brake shoe 22 conventionally comprises friction material configured for contact against respective wheels $24_1, 24_2, 24_3$ and $24_4$. However, in such a mechanical system as described, certain mechanical problems inevitably arise which, if not attended to, may impair efficient operation of the train. For example, on certain mountain railroad grades, a train may operate downhill using the pneumatic braking system described above to control train speed. Long duration, heavy-tread braking on each railway car can cause wheels to become very hot, to the point of doing actual metal temper damage to the wheels, which may be due to a brake valve malfunction. In view of this situation, and further in view of the interest in improving efficient railway operation, it is known to provide a wayside "hot wheel" detector to automatically (i.e., no human intervention) sense the temperature of wheels of a passing railroad train and alarm when the wheel temperatures become too great for continued safe operation (i.e., the wheels being overheated but still turning). The art is replete with various approaches for automatically detecting "hot wheels." As an adjunct, the art has also provided a variety of automatic detection devices to detect hot internal bearings ("hot boxes") on a passing railroad train, as seen by reference to U.S. Pat. No. 3,646,343 issues to Caulier et al. entitled "METHOD AND APPARATUS FOR MONITORING HOT BOXES." However, neither "hot wheel" detectors nor "hot box" detectors are effective in detecting another problem that may occur in a wheel/brake system on a railway vehicle, namely, the problem of a sliding wheel.

In extreme cases, the wheel/brake system can become locked wherein the wheels slide rather than roll. This condition usually involves empty or light weight cars. Nonetheless, in the foregoing-described case of wheels not retarding properly (i.e., either sliding or malfunctioning), existing "hot wheel" and "hot box" detectors have not measured a high temperature, as they were designed to do. Accordingly, such conventional detectors have not stopped such trains for overheated wheels or bearings. The sliding wheel situation can result in wheels with an out-of-round shape, either from the wheel running-surface metal wearing away (i.e., leaving flat spots) or from metal adhesion tearing away the top surface of the running rails wherein the torn away metal is actually deposited on the wheel running surface. This results in a built-up tread defect. The foregoing-described defects can cause a wheel flange to jump over the rail (i.e., a loss of guide-way), break the rail (i.e., an excessive shock force) or break the wheel (i.e., an excessive shock force or loss of metal temper) when the wheel again begins to turn. These conditions can result in a quick, and unexpected derailment.

One approach taken in the art in an effort to detect sliding wheels involves a camera-based system that sought to capture the 2-D temperature profile of a wheel. Such system, however, had a variety of problems, including durability (respecting the camera), complex processing, and in the end, unreliable detection.

There is therefore a need to provide an improved automated system for monitoring a moving train on a track that minimizes or eliminates one or more of the problems as set forth above.

SUMMARY OF THE INVENTION

One object of the present invention is to minimize or eliminate one or more of the problems as described in the Background. One advantage of the present invention is that it automatically monitors and detects poorly performing wheel/brake systems, including a sliding wheel condition. The invention recognizes the behavior of a locked or sliding wheel as its temperature is reduced compared to that of other wheels on the same brake system that are being braked normally, due to the large amount of heat generated by the braking action itself (i.e., the friction material in contact with the wheel itself) particularly as compared to a sliding wheel. Thus, unlike the hot wheel or hot box automatic monitoring and detection system known in the art, which look for an increased temperature above a predetermined threshold, the present invention is configured to recognize an abnormally low wheel temperature as a possible malfunctioning wheel/brake system or even a sliding wheel condition.

A method of monitoring a train moving on a track is provided and includes a first step of determining a first temperature parameter of a first wheel of a first axle of the train. A second step includes determining a second temperature parameter of a second wheel of a second axle of the train different from the first axle. Finally, detecting a malfunctioning wheel/brake such as a sliding condition when a ratio between the second temperature parameter and the first temperature parameter exceeds a predetermined threshold. Preferably, the method also includes the step of checking the average temperature to ensure that braking is actually occurring (i.e., that an average temperature exceeds a predetermined limit).

In a preferred embodiment, the method further includes the step of identifying a car in the train, which includes at least the plurality of trucks having brakes under the control of a brake valve. The invention preferably analyzes wheels associated with a particular brake valve together. In the preferred embodiment, the step of determining the first temperature parameter may be performed in relation to the axle being checked for a sliding condition. Preferably, the first temperature parameter is the higher one of the measured temperature values of the two wheels on such first axle. The step of determining the second temperature parameter may be performed by the substeps of measuring temperatures for each one of the pair of wheels of each axle of the controlled trucks (i.e., those wheels/axle trucks whose brakes are controlled by the same brake valve) other than the first axle, and producing respective measured temperature values; selecting, on a per axle basis, the lower one of the pair of measured temperature values; and, calculating the second temperature parameter by averaging the lower measured temperature values selected above in the selecting step.

A wheel's temperature (i.e., the wheel under test) when compared to the average of the temperatures of the other wheels on the same brake group, will develop or otherwise result in a ratio. This process when repeated for each axle within the brake group will result in a set of ratios. When the ratio of any given wheel/brake combination exceeds the above-described predetermined threshold, an alarm is generated.

An apparatus for monitoring a train moving on a track is also presented.

Other objects, features, and advantages of the present invention will become apparatus to one skilled in the art from the following detailed description and accompanying drawings illustrating features of this invention by way of example, but not by way of limitation.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 2:
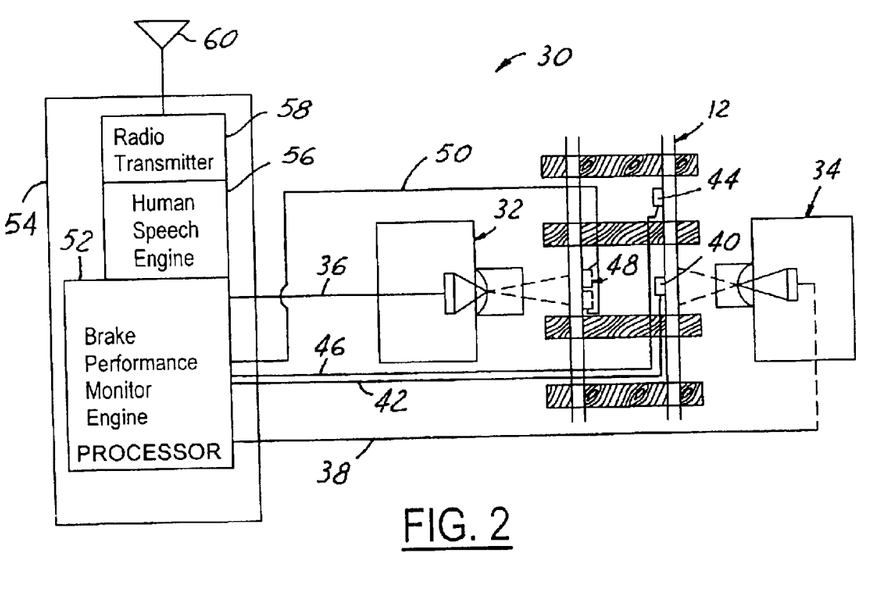
FIG. 2 is a schematic and block diagram view of a preferred embodiment of the present invention.

FIG. 2 is a simplified schematic and block diagram view of an apparatus 30 for monitoring a moving train in accordance with the present invention. Before proceeding to a detailed description keyed to the components of the figures, an overview will be set forth.

Lower Wheel Temperature.

The present invention provides the capability of accurately and repeatably monitoring and detecting malfunctioning brake systems, including a locked or sliding wheel through the recognition that such a wheel will have a significantly reduced wheel temperature as compared to the other, properly braking wheels associated with the same brake valve. This is because a properly braking wheel is dissipating a large amount of heat, whereas an improperly braking wheel, or locked or sliding wheel, is not.

Ratios.

The use of ratios in accordance with the present invention eliminates false stops due to a lightly loaded car (slightly elevated average temperature), poorly performing brakes (improperly elevated temperature), or non-dangerous brake system malfunctions (no elevated temperature). The use of ratios also normalizes the observed wheel temperatures on each car for ambient conditions of weather, axle loading, and train speed.

Identification Process.

Identification of cars within a train, and further, trucks within a car, and inferring groupings of trucks as being associated with a particular brake valve plays a not insignificant role in accordance with the invention. A rule set needed to support the function of distinguishing false stops, as described above, includes isolating cars with all wheel temperatures very low, since these cars generate unstable ratios (in any event, are generally not dangerous). The rule set further requires the car recognition processes to recognize car brake systems as a result of true car recognition. That is, many modern car systems have, in fact, multiple, isolated air brake systems, and each of these perform and can fail independently. Accordingly, multiple averages are preferably used, built around information associated with each individual brake valve, in order to calculate the ratios according to the invention.

With continued reference to FIG. 2, apparatus 30 includes at least a first wheel temperature sensor 32, and preferably a second wheel temperature sensor 34, each configured to generate a respective temperature indicative signal 36 and 38, a wheel position sensor 40 configured to generate a wheel position signal 42, an optional, second wheel position sensor 44 to generate a second wheel position signal 46 (for ascertaining train direction), an optional set 48 of wheel position sensors generating a wheel window signal 50, a processor 52 contained, for example, in a wayside house 54, an optional human speech engine 56, a radio transmitter 58, and an antenna 60. It warrants noting that train direction may be useful in determining whether a train is climbing a grade or whether the train is going down a grade. That is, train direction is useful in railway grade deployment of the system of the invention. Trains climbing a grade should show little or no heat generated by braking, heat from brakes applied while climbing a grade is a sign of brake malfunction. Trains descending a grade should be checked for overtemperature wheels, sliding wheels and non-performing brakes.

Temperature sensor 32, in one embodiment, is the only temperature sensor in apparatus 30, and is disposed on a first side of track 12. It should be appreciated by those of ordinary skill in the art, that, when one wheel is sliding, the opposing wheel on the opposite rail of track 12 will also be sliding, due to the hard coupling obtained through the connecting axle. However, those of ordinary skill in the art will also appreciate that due to split or cracked brake shoes, broken pins, or the like, that the temperatures of both wheels associated with a single axle may not be the same, or even close to the same. And since a sliding condition is not the only wheel/brake malfunction being checked by the invention, preferably both wheels on an axle would be monitored. Accordingly, apparatus 30 preferably includes the second temperature sensor 34 disposed on the opposing side of track 12 so that a respective temperature for each wheel on a per axle basis may be detected and provided to the processor 52. In one embodiment, each sensor 32, 34 may comprise an infrared (IR) detector contained within a housing, and further including as known an IR lens in order to scan a predetermined area, such as the scanned area indicated by the broken lines extending across sensors 32 and 34 in FIG. 2. It should be understood, however, that there are a variety of other temperature sensing technologies suitable for use in accordance with the present invention. Sensors 32 and 34 are configured, therefore, to detect a temperature of a respective passing wheel (not shown in FIG. 2) of the train and generate temperature signals 36 and 38 indicative of the respective detected temperatures. In a constructed embodiment, the sensors 32 and 34 are configured so as to produce a null signal at ambient temperature, and generate an increasing analog signal as the detected temperature increases (i.e., a difference relative to ambient temperature). It should be fully understood, however, that the foregoing is not required and that adjustments or accommodations in the subsequent processing system may be made to accommodate a wide variety of sensing technologies, output signal formats and the like, as known to those of ordinary skill in the art.

Apparatus 30 further includes wheel position sensor 40 disposed in sensing relation to track 12 configured to detect the presence of a passing wheel of a moving train, and generate wheel position signal 42 in response thereto. In alternate embodiments, an advance or post sensor 44 may be provided in order to determine the direction of the moving train. In a still further embodiment, set 48 of transducers may be provided and used to outline a scan window, and to generate, additionally, a direction of the moving train. The technology for sensors 40, 44, and sensor set 48 may comprise conventional components known to those of ordinary skill in the art and need not be described in any further detail.

Processor 52 is configured generally as a brake performance monitor, and processes the sensor information, namely the wheel temperature signals 36, 38 and one or more of the wheel position signals 42, 46 and 50, to perform a variety of functions, including but not limited to, determining the presence of the train, determining the layout of the cars contained in the passing train, including the position of the various trucks and axles thereof, identifying a single brake valve and determining the trucks/axles/wheels associated therewith, generating a set of ratios for the wheels, on a per-brake valve basis, determining whether the scan of a passing train is valid, and generating an alarm and transmitting the same to the crew of a passing (or just passed) train when an alarm is produced. Processor 52 may comprise conventional hardware and software as known to those of ordinary skill in the art, such as, for example only, a central processing unit, main memory, non-volatile information storage (e.g., hard drive), and the like configured with a suitable operating system, and arranged to execute programmed software routines, in conformance with the description provided in greater detail hereinafter.

Human speech engine 56, although shown separate from processor 52, may be included as a part thereof, or may be coupled to processor 52 as a separate unit. Human speech engine 56 is provided to convert messages generated by processor 52 into a human recognizable form for transmission, by way of transmitter 58 and antenna 60, to the crew of the passing (or just passed) train. Human speech engine 56, radio transmitter 58, and antenna 60 may all comprise conventional components known to those of ordinary skill in the art.

Figure 3:
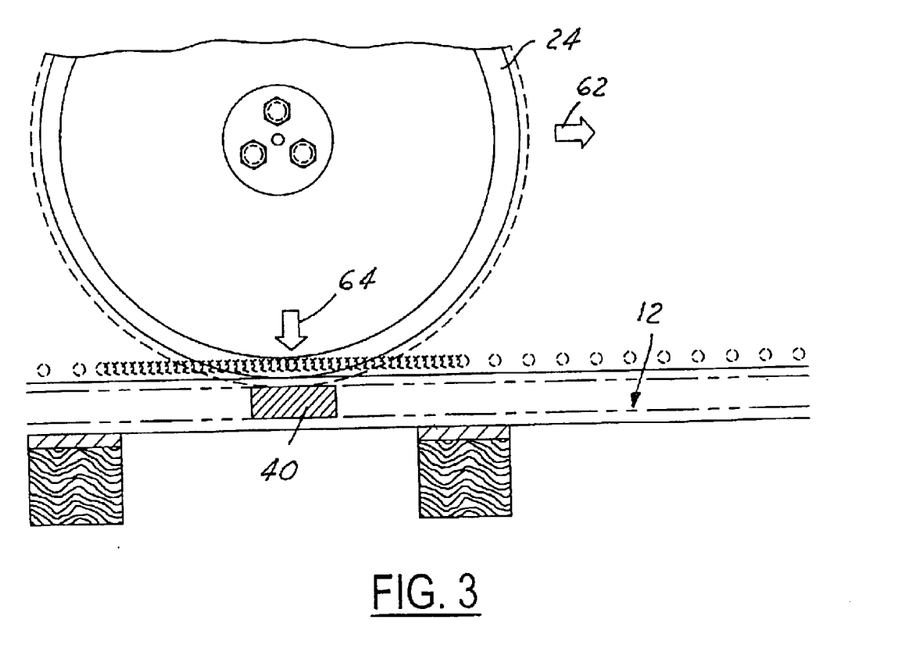
FIG. 3 is a side view of a railway wheel on a track in sensing proximity to a wheel temperature sensor.

FIG. 3 is a simplified diagrammatic view of a wheel 24 in sensing proximity to one of sensors 32, 34, as detected by position sensor 40. Specifically, in FIG. 3, the wheel 24 is translating in a direction 62 relative to track 12. One of the temperature sensors 32, or 34, when activated by position sensor 40, samples a plurality of overlapping areas on wheel 24, thereby producing a corresponding plurality of temperature values (i.e., as converted at predetermined time intervals from the analog signal produced by the temperature sensor). The foregoing may be likened to taking a series of overlapping "snapshots" of the temperature of the specimen wheel 24 as it passes by the wheel temperature sensor. The "snapshot" sample for the position of the wheel as shown in FIG. 3 is indicated by reference numeral 64. It should be understood that the position of wheel 24 as it approaches the temperature sensor (and as it passes the temperature sensor) is monitored by the wheel position sensor 40. The temperature and wheel position information is accumulated by processor 52 for subsequent processing after the specimen wheel 24 is no longer in view of the temperature sensor, as described in detail hereinafter.

Figure 4:
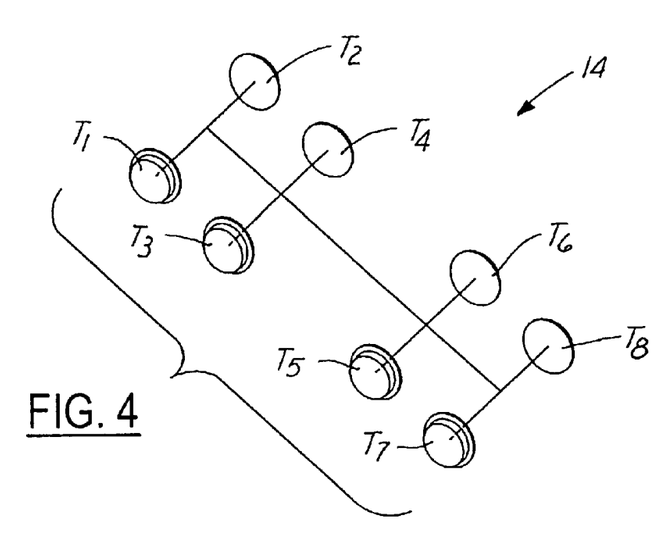
FIG. 4 is a diagrammatic view showing exemplary wheel temperatures $T_1$–$T_8$ for a typical car of a train.
Figure 5:
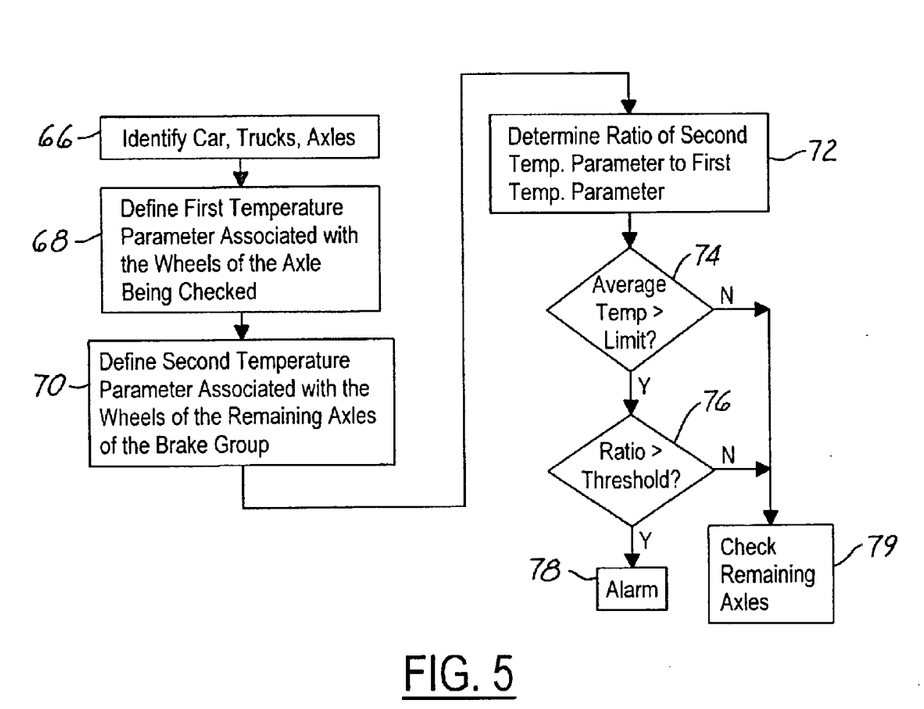
FIG. 5 is a flowchart diagram showing a method of determining a sliding condition in accordance with the present invention.

Referring now to FIGS. 4 and 5, a description of the broad aspect of the present invention will now be set forth. FIG. 4 illustrates a car 14 having a pair of trucks, each with two axles (i.e., therefore four wheels per truck). The pair of trucks are associated with a single brake valve. With reference to FIG. 5, in step 66, the method of the present invention is operative to identify the various cars, and trucks (and axles) thereof in the train. Additionally, the method identifies a brake valve and makes an association between that brake valve and all the wheels controlled for braking thereby. As described above, braking systems associated with each brake valve operate, and may fail independently of one another, therefore, it is important to analyze wheels that are on the same brake valve together. This identification approach will be described in greater detail hereinafter. In addition, for purposes of the description in connection with FIGS. 4 and 5, respective temperature values $T_1, T_2, \ldots T_8$ for each of the eight wheels in the exemplary car 14 in FIG. 4 have also been ascertained by the method of one invention. The method then proceeds to step 68.

In step 68, the method according to the invention begins calculation of a ratio, as referred to above. Specifically, a first temperature parameter is defined that is associated with the wheels of an axle being checked. The process involves, in a preferred embodiment, proceeding axle by axle within a brake valve group. Taking the first (top most) axle in FIG. 4 as exemplary (i.e., the axle associated with wheels having temperatures designated $T_1$ and $T_2$), first temperature parameter may be the temperature value $T_1$ or the temperature value $T_2$, the average of $T_1$ and $T_2$, or, preferably, the higher one of the temperature values $T_1$ and $T_2$. The method proceeds to step 70.

In step 70, a second temperature parameter is defined that is associated with the wheels of the remaining axles of the brake group. As described above, the wheels/axles shown in FIG. 4 have been assumed, for purposes of this example, to be associated with the same brake valve group. The remaining axles are thus the second, third and fourth axles having wheels with temperatures designated $T_3$–$T_8$. Second temperature parameter may be defined as the arithmetic average of the temperature values $T_3$ through $T_8$. In a preferred embodiment, however, the second temperature parameter may be the arithmetic average of three values, namely, the lower one of the temperature values of the two wheels for each axle taken on an axle by axle basis for the remaining axles (i.e., the axles of the brake group other than the axle being checked). That is, the arithmetic average of: the lower temperature value of $T_3/T_4$, the lower temperature value of $T_5/T_6$, and the lower temperature value of $T_7/T_8$. These three temperatures of the remaining three axles (for the example shown in FIG. 4) are averaged to calculate the second temperature parameter. The method then proceeds to step 72.

In step 72, the ratio of the second temperature parameter to the first parameter is determined. That is to say the second temperature parameter is divided by the first temperature parameter to obtain a ratio. The method then proceeds to step 74. In step 74, the method of the invention checks the average temperature of the wheels of the brake group against a predetermined limit. The purpose of the limit check is to ensure that the subsequent check of the ratio against the predetermined threshold will be valid. For example, if the brake valve for the brake group is malfunctioning, none of the wheels will be in a braking condition, and thus a temperature rise in any of the wheels is unlikely. Stated another way, a reduced temperature in the foregoing circumstance is not necessarily indicative of a sliding condition, but rather may just be a malfunctioning brake valve, which would result in all of the wheels in a brake group having an ambient, or near-ambient temperature. In a preferred embodiment, the "average temperature" that is compared to the limit in step 74 is taken with respect to wheels of the axles in the brake valve group other than the axle being checked. If the average temperature is greater than the predetermined limit, then the method branches to step 76. Otherwise, the method proceeds to step 79, wherein the method according to the invention is operative to check the remaining axles in the same manner as described herein.

In step 76, the ratio calculated in step 72 is checked against the predetermined threshold. If the ratio exceeds the threshold, then this result is indicative of a malfunctioning brake system, and perhaps a sliding wheel condition depending on the level of the ratio chosen, and the degree to which the ratio exceeds the chosen threshold. The method then proceeds to step 78.

In step 78, an alarm is generated indicating that a malfunctioning wheel/brake condition exists, perhaps a sliding wheel condition. Otherwise, control of the method branches to step 79.

EXAMPLE

Assume a moderately loaded car 14 traveling at about 20 miles per hour down a 0.7% grade. Properly operating, braking wheels may, under such circumstances, be substantially above ambient temperature, for loaded cares for example, in the range of 500–600° F. above ambient temperature. Empty or lightly loaded cars can have lower temperatures than loaded cars. However, a sliding wheel, may, on the other hand, be relatively close to ambient temperature. Assume that the wheels for the first axle in FIG. 4 have temperatures $T_1=5°$ F. (above ambient) and $T_2=10°$ F. (above ambient). Further assume that $T_3=550°$ F., $T_4=550°$ F., $T_5=500°$ F., $T_6=600°$ F., $T_7=600°$ F., and $T_8=625°$ F., all considered above ambient temperature. As to the first temperature parameter associated with the wheels of the axle being checked, in a preferred embodiment, the first temperature parameter would assume the value equal to the higher one of the temperature values of $T_1$ and $T_2$, namely, 10° F. Also in the preferred embodiment, the second temperature parameter associated with the wheels of the remaining axles in the brake valve group would be the average of the lower temperature value for each axle (i.e., taken on axle-by-axle basis). Thus, the temperature values $T_3$ (550), $T_5$ (500), and $T_7$ (600) would be selected for averaging. The second temperature parameter would thus assume the average, namely, 550° F. The ratio in this example is 550° F. divided by 10° F., or 55 (unitless). To detect a sliding wheel condition, as described above, two conditions must be met: (1) the average temperature (of the "other wheels" in a preferred embodiment) must exceed a predetermined limit; and (2) the ratio must exceed a predetermined threshold. For purposes of this example, assume the average temperature limit equals 100° F., and the ratio threshold is 5×(for sliding wheel detection). In this example, a sliding wheel condition would be detected for the wheel(s) of the first axle.

In a constructed embodiment, a true sliding wheel generally is characterized by a ratio of at least 10×. A practical sliding wheel threshold may be about 5×, a safe threshold to account for a situation in which a wheel had been braking properly, for example, for halfway down a grade, and then hits a grease patch, or otherwise malfunctions or improperly performs, and thereafter begins sliding (i.e., the wheel had been properly braking, had heated up, but then began to cool off due to the sliding condition halfway down the grade). This reduced threshold accounts for this scenario. A ratio of between about 2×–5× could indicate that the wheel/brake is not performing correctly, or there may be some other malfunction, but generally not a sliding wheel condition. Finally, a ratio between about 0×–2× generally indicates a properly functioning wheel/brake combination.

Figure 6:
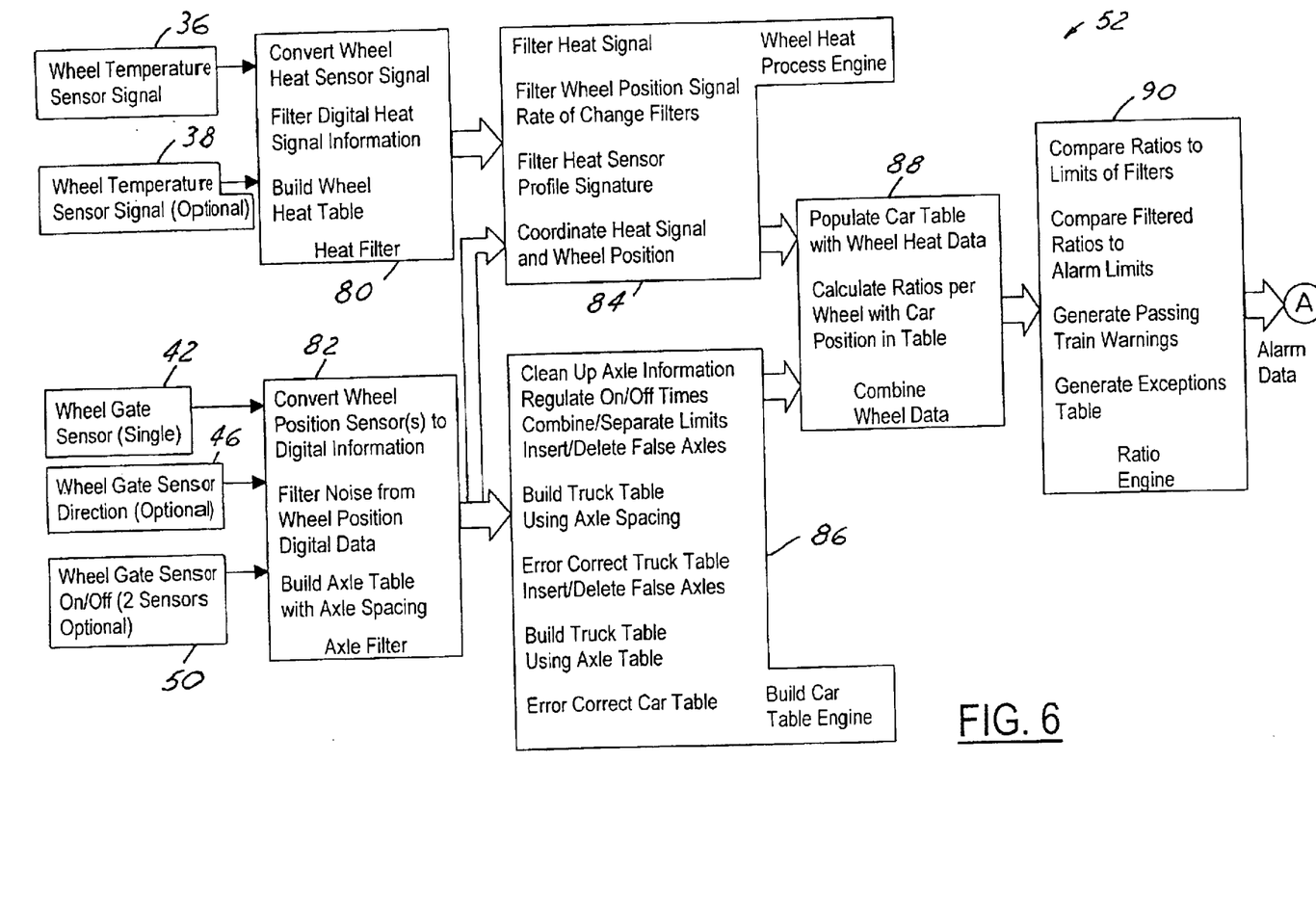
FIG. 6 shows, in greater detail, the processing steps of the method illustrated in FIG. 5.

FIG. 6 illustrates data and process flows in an embodiment according to the present invention. Various blocks are illustrated. It should be understood that each of the blocks, and the flows related thereto, may be implemented in a programmed processor such as processor 52, and preferably is.

Overview.

Generally, when the passing of a wheel across any of the wheel position sensors occurs, a wheel position signal is generated, shown in FIG. 6 as one of the signals 36, or 38, or both in alternate embodiments. This is the indication to processor 52 to commence processing (i.e., to recognize the start of a train). Data is gathered while the train passes, including wheel temperature information by way of inputs designated by reference numerals 36, and 38, and axle spacing information by inputs designated by reference numerals 42, and optionally 46, 50. The foregoing data is digitized, tested for validity, and placed in tables for further processing by heat filter 80 for wheel temperature information, and axle filter 82 for axle spacing. As the train passes the site (as shown in FIG. 2), processor 52 begins to fill a table with axle spacing data, and this axle spacing data is processed by the build car table engine 86, to "clean" such data for subsequent use in building or otherwise generating a truck table for a car. The wheel temperature signals that were previously captured are also processed and cleaned up through filters and profile algorithms to characterize a wheel's braking performance as a single temperature value by way of the wheel heat process engine 84 (i.e., recall that a plurality of temperature samples are obtained by sampling various portions of the wheel 24, as shown in FIG. 3).

As trucks, and then cars, are identified, preferably around brake valve groupings in build car table module 86, the wheel temperatures associated with the car's brake valves are grouped to allow the calculation of a ratio in combined wheel data module 88. That is to say, a real car 14 may, in fact, include multiple brake valve groups, and each group thus being considered a "car." A set of ratios is generated for each wheel corresponding to all of the wheels associated with the brake valve, and further, for all of the brake valves contained in a passing train. As the ratios for a brake valve are determined, the overall average temperature of any brake valve's wheels are checked to determine if such overall average temperature exceeds a predefined limit (first condition), and whether the ratio is equal to or greater than a predetermined threshold ratio (second condition). If both conditions are met, an alarm is generated, by ratio engine 90.

Detail.

With reference to FIG. 2, sensors 32, 34 contain alignment and focusing components for determining the heat in a passing wheel. These sensors 32, 34 further contain optical and electrical filters to prevent sparks or sunlight from affecting the wheel temperature determination process. With further reference to FIG. 6, heat filter 80 is configured to convert analog signals 36 and 38 generated by track side sensors 32, and 34 to corresponding digital temperature values. In a constructed embodiment, the digital values are checked against rate-of-change profiles to filter the raw signal input against micro-phonic noise (i.e., noise of this type is very often experienced from such track side sensors 32, 34). The plurality of digital temperature values are, in the constructed embodiment and for example only, passed through a 5-pass filter to determine an overall profile of the snapshot samples taken while the wheel is in view of the sensor. These processed digital temperature values are then placed in a wheel heat table and passed to wheel heat process engine 84.

Axle filter 82 is configured, among other things, to sequentially determine elapsed times between successive detections of wheels of the moving train. Axle filter 82 accomplishes the foregoing by first converting one or more of the wheel position signals 42, 46, 50 to digital values. The digital values are then checked for edges to determine the presence of the wheel in the field of view of the temperature sensors 32, 34. It should be appreciated that the wheel position sensors are arranged and configured, relative to the temperature sensors 32, 34, to ensure this correspondence. The digital information is filtered to remove noise therefrom. Finally, an axle table is constructed using the observed axle spacings. The axle table ("wheel presence data") is passed to module 86 to determine the limits of wheel view for calculation of a single temperature value that characterizes the wheel (i.e., prepared from multiple snapshots), and also for determination of wheel speed and spacing of wheels to allow module 86 to determine truck and car spacing.

Wheel heat process engine 84 is configured to, in combination with heat filter 80, and inputs 36, and 38, measure the temperatures for the wheels of respective axles and produce a respective temperature value. Module 84 receives filtered and cleaned wheel temperature data for each wheel set from heat filter 80. Module 84 receives the above-described "wheel presence data" from module 82, and this data, which is indicative of the presence of the wheel in the field of view of the temperature sensor, is used to determine the limits of wheel view for calculation of the single temperature characterization value for a wheel. That is, the profiled array of data (i.e., the plurality of snapshots resulting in a plurality of temperature values taken of the wheel— see FIG. 3) is filtered to determine a single temperature value to characterize the temperature of a passed wheel. Each wheel, after the processing of module 84, is characterized by a single temperature value ("wheel temperature characterization value").

Build car table module 86 is configured to identify one or more cars contained in the train, and the plurality of trucks associated with each car and to further determine the trucks that are associated with a single brake valve ("controlled trucks"). Identify means, at least, ascertaining the relative position of the cars, trucks, and the association of particular trucks with a particular brake valve, all within the train. Module 86 is operative to process the data of axle spacing ("axle table") and compare the same to filter values to clean up the axle data to remove spikes or skips and generate clean axle spacing data. Axles may be inserted, or falsely detected axles may be deleted. These decisions may be based on well known relationships and constructions of cars, and their truck types, configurations, etc. From the data in this array, trucks are identified in a truck table. This truck table is checked by module 86 to determine, and confirm, that truck sizes and axle numbers per truck are within limits, and further, appear to match on opposite ends of a car (balanced deployment of trucks). Axles may be added and subtracted using programmed limits to force a balanced car, in a preferred embodiment. The truck table described above is thereafter used by module 86 to build a car table. Trucks from the above truck table are matched and checked for spacing (i.e., using the elapsed times referred to above as one way to measure "spacing") to determine cars and the axles associated therewith. It bears emphasizing that the car table built by module 86 correspond to trucks associated with a single brake valve. That is, a true car may, in fact, contain a large number of trucks, the trucks being controlled by multiple, separate brake valves. As described above, it is important to segregate information on a per brake valve basis, inasmuch as brake valves can operate, and fail, independently. Segregation, as described above, improves the reliability of the method in accordance with the present invention. Other approaches are known for determining truck and cars, for example, U.S. Pat. No. 3,646,343 issued to Caulier, referred to in the Background. While this or other known methods may be used to distinguish true cars, and trucks, they all must be supplemented by the present invention, which goes further and segregates true cars based on detection of brake valves. This detection may be based on the use of a knowledge base containing a variety of true car configurations, and how they are broken up, if at all, into multiple braking sections (valve groupings).

Module 88 is configured to determine the above-described ratio for each wheel in a car. Of course, this function is repeated for all wheels/brake valve groupings in the train. In this regard, module 88 provides the means for determining the first, and second temperature parameters described above in connection with FIGS. 4 and 5. The plurality of single temperature values (one for each wheel) is passed to module 88 to fill in the table of wheels, trucks, and cars built by module 86. The resulting wheel/car/temperature value table is used by module 88 to calculate ratios for each wheel within the car (as defined, those trucks associated with a particular brake valve). As alluded to above, there are a variety of methodologies for calculating a ratio in accordance with the present invention. First, the temperature of each wheel is used to divide the average temperature of the "other wheels" in the car (brake valve grouping). A second, preferred method is used where the two temperature sensors, namely wheel temperature sensors 32, and 34 are employed, and is as follows. The process proceeds, axle-by-axle within a car (brake valve grouping). As to the wheels of the first axle being checked, the higher one of the two temperature values of these wheels is selected as the first temperature parameter. As to the remaining axles within the car (brake valve grouping) other than the axle being checked, an average is taken of the lower temperature wheel for each of the axles, which defines the second temperature parameter for the ratio. The ratio is then calculated by dividing the second temperature parameter by the first temperature parameter. In an alternate embodiment, the ratio may be further divided by the number of axles per car. The resulting ratio is indicative of the braking performance for the particular wheel being checked. The foregoing methodology also normalizes all wheel brake performance temperatures for speed, load, amount of braking applied, and the number of axles per car. The resulting ratio and average temperature of the "other wheels" is saved in a table for use by ratio engine 90.

Ratio engine or module 90 is configured to determine a wheel/brake malfunction which may include a sliding condition of a wheel based on (i) the above-described calculated ratio, and (ii) the average temperature of the "other wheels," relative to the wheel being checked. The processing of module 90 uses the average of the "other wheels" for each wheel being checked in the table to determine if any given car should be checked for brake performance. If the average of all of the wheel temperatures for a given car are less than some predetermined limit (e.g., 100° F.), then all of the ratio values for this car (i.e., brake valve grouping) are set to one, and no further action is taken. For cars with a well-performing brake function (i.e., an elevated average temperature), wherein the average of all the wheel temperatures exceed the predetermined limit mentioned above, then further checks are made of the ratio values. In particular, the ratio values are checked against a predetermined threshold to determine a malfunctioning wheel/brake combination, or perhaps even a sliding wheel. The predetermined thresholds may be as described above in the example. The resulting ratio therefore provides a measure of per "wheel set" brake performance. An output table of brake ratios exceeding the predetermined threshold is constructed by module 90, and is passed as "alarm data" to post-train processing module 92 (shown in FIG. 7).

Figure 7:
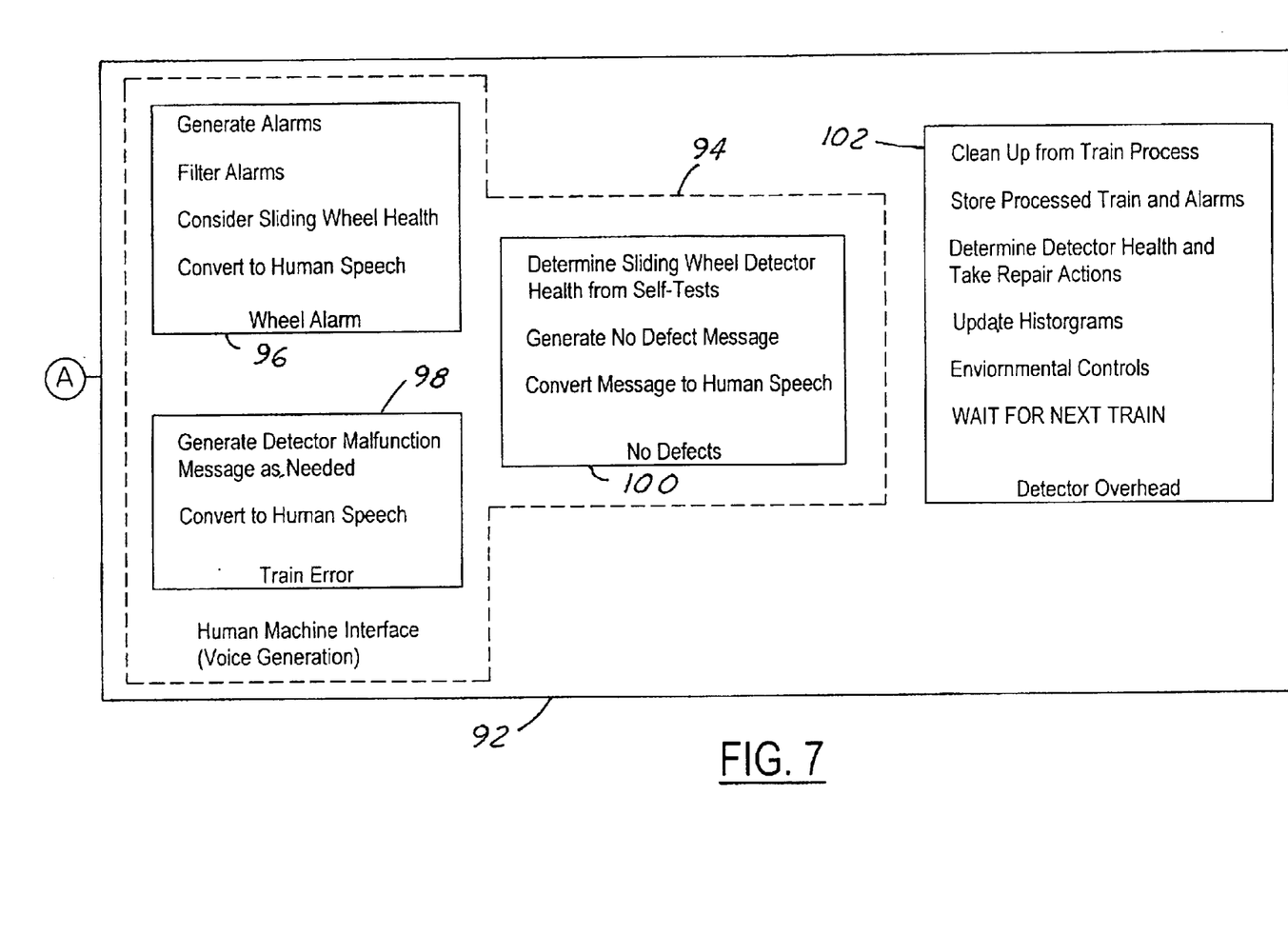
FIG. 7 shows, in greater detail, the alarm generation methodology in accordance with the present invention.

FIG. 7 is a flow diagram view of a post-train processing module 92 in accordance with the present invention. FIG. 7 illustrates the detailed process of generating voice messages, and post-processing to configure the apparatus 30 to wait for the next train. FIG. 7 also shows a voice generation module 94 (contained in dashed-line format), which further includes a wheel alarm module 96, a train error module 98, and a "no defects" module 100. Post train processing module 92 further includes a "detector overhead" module 102. Module 94 represents the generation of speech data as needed from the results of the alarm data produced at the output of ratio engine 90.

Module 100 is configured to perform various self-tests on apparatus 30 (shown in FIG. 2) and to record any errors. If the self-test indicates a functioning apparatus 30, and there were no exceptions noted in the alarm data generated from ratio engine 90, then module 100 passes a "no defect" request to the voice generation process, which may be the human speech engine 56 shown in FIG. 2. By way of radio transmitter 58 and antenna 60, such a message may be transmitted to the crew of a passing (or passed) train.

Module 96, if there are exceptions noted in the alarm data generated by ratio engine 90, and the number of exceptions do not exceed a predetermined number, another message is generated and passed, again to the human speech engine 56, radio transmitter 58, and antenna 60 to transmit such other message, including the exceptions, to the train. If any self-check functions failed, or if there are an excessive number of alarms generated by apparatus 30, a system malfunction message is produced and sent to human speech engine 56, radio transmitter 58, and antenna 60 for transmission of the same to the train. Control of the process is then passed to module 102.

Module 102 is configured to perform a clean up procedure condition apparatus 30 to wait for the next train. Module 102 also receives and handles any requests for human input and output (ie., reports). When the next train is detected, the processing described herein commences anew.

What is claimed is:

1. A method of monitoring a train comprising the steps of:
   (A) determining a first temperature parameter of a first wheel of a first axle of the train;
   (B) determining a second temperature parameter of a second wheel of a second axle of the train different from said first axle; and
   (C) detecting a malfunction condition when a ratio between said second temperature parameter and said first temperature parameter exceeds a predetermined threshold.

2. The method of claim 1 wherein said malfunction condition comprises a sliding wheel condition.

3. The method of claim 2 wherein said train includes at least one car having at least one brake valve configured to control a braking action of trucks coupled thereto, said controlled trucks including said first and second axles, wherein determining said second temperature parameter includes the substep of:
   processing temperature values of predetermined wheels of said axles of said controlled trucks other than said first axle.

4. The method of claim 3 further comprising the step of:
   determining said first and second temperature parameters using a temperature sensor located on a first side of a track on which the train moves.

5. The method of claim 3 further comprising the step of determining said first and second temperature parameters using a pair of temperature sensors located on opposing sides of a track on which the train moves.

6. A method of monitoring a train comprising the steps of:
   (A) determining a first temperature parameter of a first wheel of a first axle of the train wherein the train includes at least one car having at least one brake valve configured to control a braking action of trucks coupled thereto, said controlled trucks including said first and second axles;
   (B) determining a second temperature parameter of a second wheel of a second axle of the train different from said first axle including the substep of processing temperature values of predetermined wheels of said axles of said controlled trucks other than said first axle; and
   (C) detecting a malfunction condition comprising a sliding wheel condition when a ratio between said second temperature parameter and said first temperature parameter exceeds a predetermined threshold;
      further comprising the step of determining said first and second temperature parameters using a pair of temperature sensors located on opposing sides of a track on which the train moves and wherein each axle includes a pair of wheels associated therewith, said first and second temperature sensors being configured to detect a corresponding temperature for each one of the pair of wheels per axle, said step of determining said first temperature parameter including the substeps of:
      measuring temperatures for both wheels associated with said first axle and producing respective temperature values; and selecting the higher one of the measured temperature values to define the first temperature parameter.

7. The method of claim 5 wherein each axle includes a pair of wheels associated therewith, said first and second temperature sensors being configured to detect a corresponding temperature for each of the wheels per axle, and said step of determining said second temperature parameter is performed by the substep of:

averaging temperature values of both wheels of each axle of said controlled trucks other than said first axle.

8. A method of monitoring a train comprising the steps of:
(A) determining a first temperature parameter of a first wheel of a first axle of the train wherein the train includes at least one car having at least one brake valve configured to control a braking action of trucks coupled thereto, said controlled trucks including said first and second axles;
(B) determining a second temperature parameter of a second wheel of a second axle of the train different from said first axle including the substep of processing temperature values of predetermined wheels of said axles of said controlled trucks other than said first axle; and
(C) detecting a malfunction condition comprising a sliding wheel condition when a ratio between said second temperature parameter and said first temperature parameter exceeds a predetermined threshold;
further comprising the step of determining said first and second temperature parameters using a pair of temperature sensors located on opposing sides of a track on which the train moves and wherein each axle includes a pair of wheels associated therewith, said first and second temperature sensors being configured to detect a corresponding temperature for each one of the pair of wheels per axle, and said step of determining said second temperature parameter is performed by the substep of:
measuring temperatures for each one of the pair of wheels of each axle of said controlled trucks other than said first axle and producing respective measured temperature values;
selecting, on a per axle basis, the lower one of the pair of measured temperature values;
calculating said second temperature parameter using the lower measured temperature values selected in said selecting step.

9. The method of claim 8 wherein said calculating step is performed using an averaging function.

10. The method of claim 9 wherein said predetermined threshold is between 5 and 100.

11. The method of claim 10 wherein said predetermined threshold is about 5.

12. A method of monitoring a train comprising the steps of:
(A) determining a first temperature parameter of a first wheel of a first axle of the train;
(B) determining a second temperature parameter of a second wheel of a second axle of the train different from said first axle;
(C) detecting a malfunction condition when a ratio between said second temperature parameter and said first temperature parameter exceeds a predetermined threshold;
sequentially determining elapsed times between successive detections of wheels of the moving train;
identifying a car position in said train in accordance with said elapsed times; and
identifying respective truck positions of said controlled trucks in said car using said car position and said elapsed times.

13. The method of claim 12 further comprising the step of:
generating an alarm upon detection of said sliding condition.

14. The method of claim 13 further comprising the steps of:
comparing said second temperature parameter against a minimum temperature limit;
performing said step of generating an alarm when said second temperature parameter is greater than a minimum temperature limit.

15. A method of monitoring a train moving on a track comprising the steps of:
(A) identifying a car in the train, which includes one or more trucks having brakes controlled by a brake valve;
(B) defining a first temperature parameter associated with wheels of a first one of the axles of said controlled trucks;
(C) defining a second temperature parameter associated with wheels of preselected ones of the axles said controlled trucks;
(D) detecting a braking condition when a third temperature parameter associated with predetermined wheels of said controlled trucks exceed a minimum limit; and
(E) detecting a sliding condition when said braking condition is detected and when a ratio between said second temperature parameter and said first temperature parameter exceeds a predetermined threshold.

16. The method of claim 15 wherein each one of said plurality of axles includes a pair of wheels, and said preselected ones of the axles comprises a remainder of said axles of said controlled trucks other than said first one of said axles associated with said first temperature parameter.

17. The method of claim 16 wherein said steps of defining said first temperature parameter and defining said second temperature parameter include:
measuring temperatures for both wheels of each axle of said controlled trucks and producing respective temperature values therefrom;
selecting the higher one of the temperature values associated with said first one axle to define the first temperature parameter;
selecting, on a per axle basis for each of said preselected axles, a respective lower temperature value; and
calculating said second temperature parameter using the selected lower temperature values.

18. The method of claim 17 wherein said calculating step is performed using an averaging function.

19. An apparatus for monitoring a train moving on a track, comprising:
a temperature sensor configured to detect a temperature of a passing wheel of the train and generate a temperature signal indicative of said detected temperature;
a wheel position sensor in sensing relation to said track and configured to detect the presence of said passing wheel and generate a wheel position signal;
a processor coupled to said wheel temperature sensor and said wheel position sensor, said processor including,
means responsive to said wheel position signal for identifying a car in the train and one or more trucks associated with said car having brakes controlled by a brake valve;

means responsive to said temperature and wheel position signals for defining a first temperature parameter associated with wheels of a first one of the axles of said controlled trucks;

means responsive to said temperature and wheel position signals for defining a second temperature parameter associated with wheels of preselected ones of the axles of said controlled trucks; and means for detecting a sliding condition of the wheels of said first one axle when a ratio between said second temperature parameter and said first temperature parameter exceeds a predetermined threshold during a braking condition.

20. The apparatus of claim 19 wherein each one of said plurality of axles includes a pair of wheels, and said preselected ones of the axles comprises a remainder of said axles of said controlled trucks other than said first one of said axles associated with said first temperature parameter.

21. The apparatus of claim 20 wherein said temperature sensor is a first temperature sensor disposed on a first side of the track, said apparatus further comprising a second temperature sensor on a second side of the track opposite said first side, said first and second temperature sensors being configured to generate a pair of wheel temperature signals, said first and second temperature parameter defining means including:

means responsive to said pair of wheel temperature signals for selecting the higher one of the temperature values associated with said first one axle to define the first temperature parameter;

means, responsive to said pair of wheel temperature signals, for selecting a respective lower wheel temperature value for each axle of said preselected axles; and means for calculating said second temperature parameter using the selected lower wheel temperature values.

22. The apparatus of claim 21 wherein said calculating means is configured to determine said second temperature parameter in accordance with an averaging function.

23. An apparatus for monitoring a train moving on a track, comprising:

a temperature sensor configured to detect a temperature of a passing wheel of the train and generate a temperature signal indicative of said detected temperature;

a wheel position sensor in sensing relation to said track and configured to detect the presence of said passing wheel and generate a wheel position signal;

a processor coupled to said wheel temperature sensor and said wheel position sensor, said processor including, means responsive to said wheel position signal for identifying a car in the train and one or more trucks associated with said car having brakes controlled by a brake valve;

means responsive to said temperature and wheel position signals for defining a first temperature parameter associated with wheels of a first one of the axles of said controlled trucks;

means responsive to said temperature and wheel position signals for defining a second temperature parameter associated with wheels of preselected ones of the axles of said controlled trucks; and means for determining brake performance associated with the wheels of said first one axle based on a ratio between said second temperature parameter and said first temperature parameter.

24. The apparatus of claim 23 wherein each one of said plurality of axles includes a pair of wheels, and said preselected ones of the axles comprises a remainder of said axles of said controlled trucks other than said first one of said axles associated with said first temperature parameter.

25. The apparatus of claim 24 wherein said temperature sensor is a first temperature sensor disposed on a first side of the track, said apparatus further comprising a second temperature sensor on a second side of the track opposite said first side, said first and second temperature sensors being configured to generate a pair of wheel temperature signals, said first and second temperature parameter defining means including:

means responsive to said pair of wheel temperature signals for selecting the higher one of the temperature values associated with said first one axle to define the first temperature parameter;

means, responsive to said pair of wheel temperature signals, for selecting a respective lower wheel temperature value for each axle of said preselected axles; and means for calculating said second temperature parameter using the selected lower wheel temperature values.

26. The apparatus of claim 25 wherein said calculating means is configured to determine said second temperature parameter in accordance with an averaging function.

27. A method of monitoring a train comprising the steps of:

(A) determining a first temperature parameter of a first wheel of a first axle of the train wherein the train includes at least one car having at least one brake valve configured to control a braking action of trucks coupled thereto, said controlled trucks including said first and second axles;

(B) determining a second temperature parameter of a second wheel of a second axle of the train different from said first axle including the substep of processing temperature values of predetermined wheels of said axles of said controlled trucks other than said first axle; and (C) detecting a malfunction condition comprising one of a sliding wheel condition or a brake malfunction when a ratio between said second temperature parameter and said first temperature parameter exceeds a first predetermined threshold and is less than a second, predetermined threshold, said first threshold is reduced relative to said second threshold;

further comprising the step of determining said first and second temperature parameters using a pair of temperature sensors located on opposing sides of a track on which the train moves and wherein each axle includes a pair of wheels associated therewith, said first and second temperature sensors being configured to detect a corresponding temperature for each one of the pair of wheels per axle, said step of determining said first temperature parameter including the substeps of:

measuring temperatures for both wheels associated with said first axle and producing respective temperature values; and selecting the higher one of the measured temperature values to define the first temperature parameter.

28. A method of monitoring a train comprising the steps of:

(A) determining a first temperature parameter of a first wheel of a first axle of the train wherein the train includes at least one car having at least one brake valve configured to control a braking action of trucks coupled thereto, said controlled trucks including said first and second axles;

(B) determining a second temperature parameter of a second wheel of a second axle of the train different from said first axle including the substep of processing temperature values of predetermined wheels of said axles of said controlled trucks other than said first axle; and (C) detecting a malfunction condition comprising one of a sliding wheel condition or a brake malfunction condition when a ratio between said second temperature parameter and said first temperature parameter exceeds a first predetermined threshold and is less than a second predetermined threshold, said first threshold is reduced relative to said second threshold;

further comprising the step of determining said first and second temperature parameters using a pair of temperature sensors located on opposing sides of a track on which the train moves and wherein each axle includes a pair of wheels associated therewith, said first and second temperature sensors being configured to detect a corresponding temperature for each one of the pair of wheels per axle, and said step of determining said second temperature parameter is performed by the substep of:

measuring temperatures for each one of the pair of wheels of each axle of said controlled trucks other than said first axle and producing respective measured temperature values;

selecting, on a per axle basis, the lower one of the pair of measured temperature values;

calculating said second temperature parameter using the lower measured temperature values selected in said selecting step.

29. A method of monitoring a train comprising the steps of:

(A) determining a first temperature parameter of a first wheel of a first axle of the train;

(B) determining a second temperature parameter of a second wheel of a second axle of the train different from said first axle;

(C) detecting a malfunction condition when a ratio between said second temperature parameter and said first temperature parameter exceeds a first predetermined threshold and is less than a second predetermined threshold, said first threshold is reduced relative to said second threshold;

sequentially determining elapsed times between successive detections of wheels of the moving train;

identifying a car position in said train in accordance with said elapsed times; and identifying respective truck positions of said controlled trucks in said car using said car position and said elapsed times.

30. A method of monitoring a train moving on a track comprising the steps of:

(A) identifying a car in the train, which includes one or more trucks having brakes controlled by a brake valve;

(B) defining a first temperature parameter associated with wheels of a first one of the axles of said controlled trucks;

(C) defining a second temperature parameter associated with wheels of preselected ones of the axles said controlled trucks;

(D) detecting a braking condition when a third temperature parameter associated with predetermined wheels of said controlled trucks exceed a minimum limit; and (E) detecting a sliding condition when said braking condition is detected and when a ratio between said second temperature parameter and said first temperature parameter exceeds a first predetermined threshold and less than a second predetermined threshold, said first threshold being reduced relative to said second threshold.

31. An apparatus for monitoring a train moving on a track, comprising:

a temperature sensor configured to detect a temperature of a passing wheel of the train and generate a temperature signal indicative of said detected temperature;

a wheel position sensor in sensing relation to said track and configured to detect the presence of said passing wheel and generate a wheel position signal;

a processor coupled to said wheel temperature sensor and said wheel position sensor, said processor including, means responsive to said wheel position signal for identifying a car in the train and one or more trucks associated with said car having brakes controlled by a brake valve;

means responsive to said temperature and wheel position signals for defining a first temperature parameter associated with wheels of a first one of the axles of said controlled trucks;

means responsive to said temperature and wheel position signals for defining a second temperature parameter associated with wheels of preselected ones of the axles of said controlled trucks; and means for detecting a sliding condition of the wheels of said first one axle when a ratio between said second temperature parameter and said first temperature parameter exceeds during a braking condition a first predetermined threshold and less than a second predetermined threshold, said first threshold being reduced relative to said second threshold.

* * * * *